(12) United States Patent
Rainisto (10) Patent No.: US 10,082,672 B2
(45) Date of Patent: Sep. 25, 2018

(54) DISPLAY APPARATUS AND METHOD OF DISPLAYING USING ELECTROMECHANICAL FACEPLATE

(71) Applicant: Varjo Technologies Oy, Helsinki (FI)

(72) Inventor: Roope Rainisto, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 15/907,914

(22) Filed: Feb. 28, 2018

(65) Prior Publication Data

US 2018/0188543 A1  Jul. 5, 2018

Related U.S. Application Data

(63) Continuation-in-part of application No. 15/623,052, filed on Jun. 14, 2017, which is a continuation-in-part of application No. 15/366,424, filed on Dec. 1, 2016, now Pat. No. 9,711,072.

(51) Int. Cl.
| | |
|---|---|
| *G06F 1/00* | (2006.01) |
| *G02B 27/01* | (2006.01) |
| *G02B 27/00* | (2006.01) |
| *G02B 7/18* | (2006.01) |
| *G03B 21/14* | (2006.01) |
| *G09G 3/00* | (2006.01) |

(52) U.S. Cl.
CPC ....... *G02B 27/0172* (2013.01); *G02B 7/1805* (2013.01); *G02B 27/0093* (2013.01); *G03B 21/142* (2013.01); *G09G 3/003* (2013.01); *G02B 2027/0138* (2013.01)

(58) Field of Classification Search
CPC ... G06F 1/00; G06F 3/00; G06F 3/013; G06F 1/163; G06F 3/14; H04N 1/00; H04N 9/3129
See application file for complete search history.

(56) References Cited

U.S. PATENT DOCUMENTS

2015/0138645 A1* 5/2015 Yoo .................... G02B 27/0101
359/630

* cited by examiner

*Primary Examiner* — Michael Faragalla
(74) *Attorney, Agent, or Firm* — Ziegler IP Law Group, LLC (57) ABSTRACT

A display apparatus including at least one focus display; at least one electromechanical faceplate detachably attached to an outer surface of the display apparatus; and a processor coupled to the aforementioned components, wherein the processor is configured to render focus image at the focus display. The display apparatus is arranged to be detachably attached to portable electronic device, the electromechanical faceplate including a wireless communication interface, wherein the aforementioned interface is employed to communicably couple the portable electronic device and the display apparatus. A processor of the portable electronic device is configured to render context image at a display thereof, an angular width of a projection of the rendered context image being greater than an angular width of a projection of the rendered focus image. Furthermore, projection of the rendered context image is optically combined with projection of the rendered focus image to create a visual scene.

14 Claims, 3 Drawing Sheets

DISPLAY APPARATUS AND METHOD OF DISPLAYING USING ELECTROMECHANICAL FACEPLATE

CROSS-REFERENCE TO RELATED APPLICATIONS

This application is a continuation-in-part of U.S. patent application Ser. No. 15/623,052, titled "DISPLAY APPARATUS AND METHOD USING PORTABLE ELECTRONIC DEVICE" and filed on Jun. 14, 2017, which is incorporated herein by reference. Furthermore, the U.S. patent application Ser. No. 15/623,052 is a continuation-in-part of U.S. patent application Ser. No. 15/366,424, titled "DISPLAY APPARATUS AND METHOD OF DISPLAYING USING FOCUS AND CONTEXT DISPLAYS" and filed on Dec. 1, 2016, which is also incorporated herein by reference.

TECHNICAL FIELD

The present disclosure relates generally to specialized devices; and more specifically, to display apparatuses comprising focus displays; electromechanical faceplates; and processors. Furthermore, the present disclosure also relates to methods of displaying via the aforementioned display apparatuses BACKGROUND Presently, several technologies are being used to present interactive simulated environments to users of specialized devices. Such technologies include virtual reality, augmented reality, mixed reality, and the like. Presently, the users utilize the specialized devices (for example, such as virtual reality headsets, a pair of virtual reality glasses, augmented reality headsets, a pair of augmented reality glasses, mixed reality headsets, a pair of mixed reality glasses, and the like) for experiencing and interacting with such simulated environments. Specifically, the simulated environments enhance the user's experience of reality around him/her by providing the user with a feeling of immersion within the simulated environment, using contemporary techniques such as stereoscopy.

Nowadays, such specialized devices are being used along with portable electronic devices (for example, such as smartphones, personal digital assistants (PDA), and the like) to create a display system that provides the simulated environment to the user. However, such specialized devices are often only compatible with portable electronic devices having a specific hardware and/or software specification. As an example, a given specialized device may only be compatible with portable electronic devices from a given manufacturer whilst being incompatible with similar portable electronic devices from other manufacturers. Therefore, such compatibility constraints substantially limit a number of portable electronic devices that could be used with the specialized devices. Conventionally, such incompatibility is addressed by using suitable adapters to couple the specialized devices and the portable electronic devices. However, different adapters are often required for different portable devices, thereby, substantially increasing a cost of the display system. Furthermore, such compatibility constraints also limit a number of external devices (such as televisions, projectors, and the like) that could be used with the existing display systems.

Therefore, in light of the foregoing discussion, there exists a need to overcome the aforementioned drawbacks associated with conventional display systems.

SUMMARY

The present disclosure seeks to provide a display apparatus.

The present disclosure also seeks to provide a method of displaying, via a display apparatus comprising at least one focus display, at least one electromechanical faceplate and a processor coupled to the at least one focus display and to the at least one electromechanical faceplate, the at least one electromechanical faceplate comprising a wireless communication interface, the display apparatus being detachably attached to a portable electronic device.

The present disclosure seeks to provide a solution to the existing problems associated with incompatibility of conventional specialized devices with different portable electronic devices. An aim of the present disclosure is to provide a solution that overcomes at least partially the problems encountered in prior art, and provides a robust and efficient display apparatus that can be used with a variety of portable electronic devices.

In one aspect, an embodiment of the present disclosure provides a display apparatus comprising:
- at least one focus display;
- at least one electromechanical faceplate detachably attached to an outer surface of the display apparatus; and
- a processor coupled to the at least one focus display and to the at least one electromechanical faceplate, wherein the processor is configured to render a focus image at the at least one focus display, wherein the display apparatus is arranged to be detachably attached to a portable electronic device, the at least one electromechanical faceplate comprising a wireless communication interface, wherein the wireless communication interface is to be employed to communicably couple the portable electronic device and the display apparatus, and wherein a processor of the portable electronic device is configured to render a context image at a display of the portable electronic device, an angular width of a projection of the rendered context image being greater than an angular width of a projection of the rendered focus image, further wherein the projection of the rendered context image is optically combined with the projection of the rendered focus image to create a visual scene.

In another aspect, an embodiment of the present disclosure provides a method of displaying, via a display apparatus comprising at least one focus display, at least one electromechanical faceplate and a processor coupled to the at least one focus display and to the at least one electromechanical faceplate, the at least one electromechanical faceplate comprising a wireless communication interface, the display apparatus being detachably attached to a portable electronic device, the method comprising:
- employing the wireless communication interface to communicably couple the portable electronic device and the display apparatus;
- rendering a focus image at the at least one focus display of the display apparatus;
- rendering a context image at a display of the portable electronic device, an angular width of a projection of the rendered context image being greater than an angular width of a projection of the rendered focus image; and
- optically combining the projection of the rendered context image with the projection of the rendered focus image to create a visual scene.

Embodiments of the present disclosure substantially eliminate or at least partially address the aforementioned problems in the prior art, and enables the described display apparatus to be conveniently used with a substantial number of different portable electronic devices.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
  at least one focus display;
  at least one electromechanical faceplate detachably attached to an outer surface of the display apparatus; and
  a processor coupled to the at least one focus display and to the at least one electromechanical faceplate, wherein the processor is configured to render a focus image at the at least one focus display,
  wherein the display apparatus is arranged to be detachably attached to a portable electronic device, the at least one electromechanical faceplate comprising a wireless communication interface, wherein the wireless communication interface is to be employed to communicably couple the portable electronic device and the display apparatus, and wherein a processor of the portable electronic device is configured to render a context image at a display of the portable electronic device, an angular width of a projection of the rendered context image being greater than an angular width of a projection of the rendered focus image,
  further wherein the projection of the rendered context image is optically combined with the projection of the rendered focus image to create a visual scene.

In another aspect, an embodiment of the present disclosure provides a method of displaying, via a display apparatus comprising at least one focus display, at least one electromechanical faceplate and a processor coupled to the at least one focus display and to the at least one electromechanical faceplate, the at least one electromechanical faceplate comprising a wireless communication interface, the display apparatus being detachably attached to a portable electronic device, the method comprising:
  employing the wireless communication interface to communicably couple the portable electronic device and the display apparatus;
  rendering a focus image at the at least one focus display of the display apparatus;
  rendering a context image at a display of the portable electronic device, an angular width of a projection of the rendered context image being greater than an angular width of a projection of the rendered focus image; and
  optically combining the projection of the rendered context image with the projection of the rendered focus image to create a visual scene.

The present disclosure provides the aforementioned display apparatus and the aforementioned method of displaying, via such a display apparatus. The display apparatus described herein comprises the at least one electromechanical faceplate that allows for coupling the display apparatus with a variety of portable electronic devices. Therefore, the at least one electromechanical faceplate allows for substantially minimizing compatibility constraints associated with the display apparatus and the portable electronic device. Furthermore, the described display apparatus has a modular structure and can be easily assembled by the user. Beneficially, processing functionality (namely, processing burden) for creating the visual scene is shared between the processors of the display apparatus and the portable electronic device, thereby, reducing processing latency in presenting the visual scene to the user. Consequently, such minimization of the processing latency enhances the user's experience of the visual scene.

Throughout the present disclosure, the term "display apparatus" relates to specialized equipment that is operable to implement at least a rendering functionality. It will be appreciated that the processor and the at least one focus display of the display apparatus are collectively operable to implement the aforesaid rendering functionality. Notably, the at least one focus display of the display apparatus is used for provisioning a focus area for rendering the aforementioned focus image.

Throughout the present disclosure, the term "rendering" generally refers to displaying a given image or a given sequence of images (namely, a video) at a given display.

Throughout the present disclosure, the term "focus display" used herein relates to a display element (for example, such as a display screen) that is configured to facilitate rendering of the focus image thereupon. Optionally, the at least one focus display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Digital Light Processing® (DLP)-based display.

Optionally, the at least one focus display is implemented by way of at least one projector and at least one projection surface. In such an instance, the at least one projector is configured to project the focus image onto the at least one projection surface, the at least one projection surface being adapted to receive the aforesaid projection of the focus image thereon. For example, a focus display may be implemented by way of a single projector and a projection surface associated therewith.

Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

It will be appreciated that the at least one focus display may also be referred to as a "focus image renderer".

Furthermore, the display apparatus is configured to support the portable electronic device and the at least one electromechanical faceplate.

Throughout the present disclosure, the term "electromechanical faceplate" relates to a sheet including at least one electromechanical component disposed thereupon. The at least one electromechanical faceplate is to be detachably attached to the outer surface of the display apparatus. In an example implementation, a single electromechanical faceplate may be detachably attached to a front face (namely, a front side) of the display apparatus, the front face of the display apparatus being furthest from the user's eyes. In another example implementation, a separate electromechanical faceplate may be detachably attached to each of: the front face (namely, the front side), a left face (namely, a side that is closest to the user's left eye) and a right face (namely, a side that is closest to the user's right eye) of the display apparatus.

Optionally, the at least one electromechanical faceplate is detachably attached to the display apparatus using an attachment means. Such attachment means include, but are not limited to, double-sided tapes, Velcro® hook and loop fasteners, screws, turnlocks, clips, and latches. Alternatively, optionally, the at least one electromechanical faceplate is snap-fitted onto the outer surface of the display apparatus. Yet alternatively, optionally, the at least one electromechanical faceplate is slid into a cavity on the outer surface of the display apparatus. It will be appreciated that the aforesaid arrangements for detachably attaching (namely, physically coupling) the at least one electromechanical faceplate to the display apparatus allow for providing a modular display apparatus to the user, which can be easily assembled when the user wishes to use the display apparatus.

According to an embodiment, upon successful attachment of the at least one electromechanical faceplate to the display apparatus, the at least one electromechanical faceplate is electronically identified by the display apparatus. Optionally, upon the aforesaid successful attachment, a wired connection is established between the at least one electromechanical faceplate and the processor of the display apparatus. Notably, in such a case, electrical contacts provided on both the at least one electromechanical faceplate are brought together to electrically engage with each other (for example, via physically touching each other) for creating the aforesaid wired connection. Thereafter, the processor may transmit and/or receive at least one identification signal via the wired connection to electronically identify the at least one electromechanical faceplate. Additionally or alternatively, optionally, upon the aforesaid successful attachment, a wireless connection is established between the at least one electromechanical faceplate and the processor of the display apparatus, and the processor may transmit and/or receive the at least one identification signal via the wireless connection to electronically identify the at least one electromechanical faceplate. As an example, the wireless connection may be established between the wireless communication interface of the at least one electromechanical faceplate and another wireless communication interface associated with the processor of the display apparatus.

As mentioned previously, the at least one electromechanical faceplate comprises the wireless communication interface, wherein the wireless communication interface is to be employed to communicably couple the portable electronic device and the display apparatus. In operation, a wireless connection is established between the portable electronic device and the display apparatus via the wireless communication interface of the at least one electromechanical faceplate and a wireless communication interface of the portable electronic device. Such a wireless connection allows the portable electronic device and the display apparatus to exchange information therebetween via a wireless network (for example, such as a Near-field communication network, a Bluetooth network, Internet, a WiFi Direct network, and the like). Optionally, the wireless communication interface of the at least one electromechanical faceplate facilitates bidirectional communication between the portable electronic device and the display apparatus. The wireless communication interface is implemented by way of a wireless network adapter (for example, such as a Near-field communication chip, a Bluetooth adapter, a WiFi adapter, a WiFi Direct adapter, and the like) that is compatible with a desired wireless network. It will be appreciated that the wireless communication interface allows for substantially minimizing compatibility constraints associated with the display apparatus and the portable electronic device. Therefore, the wireless communication interface can be employed to communicably couple the display apparatus with a variety of portable electronic devices.

In an embodiment, the at least one electromechanical faceplate has a substantially-flat shape. In another embodiment, the at least one electromechanical faceplate has a substantially flat-shape with curved edges. In yet another embodiment, the at least one electromechanical faceplate has a substantially-curved shape. In still another embodiment, the at least one electromechanical faceplate has a substantially freeform shape. In such a case, a surface of the at least one electromechanical faceplate includes protrusion(s) and/or depression(s) thereon.

It will be appreciated that the at least one electromechanical faceplate is made of a metallic material (for example, such as Aluminium, Copper, steel, and the like), a non-metallic material (for example, such as wood), a polymeric material (for example, such as plastic, silicone, glass, and the like), or any combination thereof.

Optionally, the processor of the display apparatus could be implemented by way of hardware, software, firmware, or a combination of these, configured to control operation of the display apparatus. The processor of the display apparatus is coupled to the at least one focus display and the at least one electromechanical faceplate.

Throughout the present disclosure, the term "portable electronic device" relates to portable electronic equipment including hardware, software, firmware, or a combination of these, that is operable to implement at least a rendering functionality. It will be appreciated that the processor and the display of the portable electronic device are collectively operable to implement the aforesaid rendering functionality. Notably, the display of the portable electronic device is used for provisioning a context area for rendering the aforementioned context image. Examples of the portable electronic device include, but are not limited to, a smartphone, a phablet, a personal digital assistant (PDA).

Optionally, the display of the portable electronic device is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Digital Light Processing® (DLP)-based display.

It is to be understood that the portable electronic device may also be referred to as a "hand-held device", "mobile device", and the like.

Figure 2:
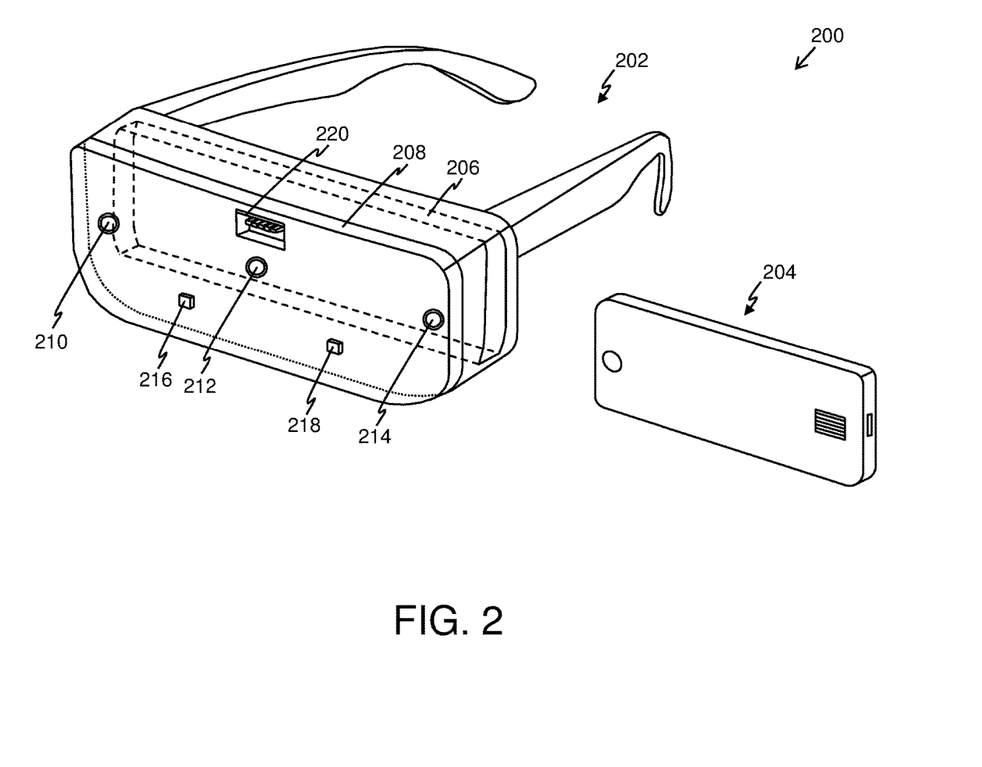
FIG. 2 is a schematic illustration of a display system comprising a display apparatus and a portable electronic device, in accordance with an embodiment of the present disclosure.

As mentioned previously, the display apparatus is arranged to be detachably attached to the portable electronic device. In an embodiment, the portable electronic device is mounted on (namely, attached to) the display apparatus. Optionally, in such an instance, the display apparatus is configured to support the mounted portable electronic device thereon. In another embodiment, the portable electronic device is slid into a cavity on a side of the display apparatus, for example, as shown in FIG. 2. Optionally, the cavity on the side of the display apparatus is shaped so as to accommodate the portable electronic device therein. It will be appreciated that the portable electronic device is attached to the display apparatus in a manner that the display of the portable electronic device is oriented towards (namely, faces) eyes of the user, when the display apparatus is worn by the user.

Furthermore, it will be appreciated that the display apparatus and the portable electronic device collectively constitute a display system. The display system is operable to act as a device, for example, such as a virtual reality device, for presenting the visual scene (for example, such as a location within a simulated environment) to the user, when the display apparatus is worn by the user and the portable electronic device is attached to the display apparatus. By way of the display system, the visual scene is projected onto the eyes of the user. Therefore, the aforesaid arrangements for detachably attaching the portable electronic device to the display apparatus allow for providing a modular display system to the user, which can be easily assembled when the user wishes to view the visual scene.

In an embodiment, the visual scene is a setting (for example, such as a coffee shop environment, a haunted house, a forest scene, and so forth) within a simulated virtual reality environment to be presented to the user. In another embodiment, the visual scene is a setting within a simulated mixed reality environment (for example, such as a scene depicting a virtual object overlaid upon a virtual representation of a real-world object) to be presented to the user. In yet another embodiment, the visual scene is a setting within a simulated augmented reality environment.

Throughout the present disclosure, the term "context image" relates to a wide image of the visual scene, which is to be rendered at the display of the portable electronic device. Furthermore, the term "focus image" relates to an image depicting a part (namely, a portion) of the visual scene, which is to be rendered at the at least one focus display of the display apparatus. In operation, the processor of the portable electronic device is configured to render the context image at the display of the portable electronic device whereas the processor of the portable electronic device is configured to render the focus image at the at least one focus display.

The angular width of the projection of the rendered context image is greater than the angular width of the projection of the rendered focus image. In some implementations, the angular width of the projection of the rendered context image may be, for example, 40, 50, 60, 70, 80, 90, 100, 110, 120, 130, 140, 150, 160, 170, 180, 190, 200, 210 or 220 degrees, whereas the angular width of the projection of the rendered focus image may be, for example, 5, 10, 15, 20, 25, 30, 35, 40, 45, 50, 55 or 60 degrees. In other implementations, the angular width of the projection of the rendered context image is greater than 220 degrees.

Throughout the present disclosure, the term "angular width" refers to an angular width of a given projection as seen from the user's eyes, when the display system is operated (namely, used) by the user. It will be appreciated that the angular width of the projection of the rendered context image is greater than the angular width of the projection of the rendered focus image, since the rendered context image is to be projected upon the retina of the user's eyes whereas the rendered focus image is to be projected on and around the fovea of the user's eyes.

It will be appreciated that the context and focus images collectively constitute the visual scene upon optical combination of their projections. Optionally, the display apparatus comprises at least one optical combiner (for example, such as a semi-transparent mirror, a semi-transparent film, a prism, a waveguide, and the like) for optically combining the projection of the rendered context image with the projection of the rendered focus image to create the visual scene.

Optionally, the display apparatus comprises means for detecting a gaze direction, the means for detecting the gaze direction being coupled to the processor of the display apparatus. In operation, the means for detecting the gaze direction detects the user's gaze and communicates the detected gaze direction to the processor of the display apparatus.

In an embodiment, the processor of the display apparatus is configured to:

(a) obtain an input image, and use the detected gaze direction to determine a region of visual accuracy of the input image;

(b) process the input image to generate the context image and the focus image, the context image having a first resolution and the focus image having a second resolution, wherein:

(i) a region of the context image that substantially corresponds to the region of visual accuracy of the input image is masked, (ii) the focus image substantially corresponds to the region of visual accuracy of the input image, and (iii) the second resolution is higher than the first resolution; and (c) communicate the context image to the processor of the portable electronic device.

In another embodiment, the processor of the display apparatus is configured to communicate the detected gaze direction to the processor of the portable electronic device, wherein the processor of the portable electronic device is configured to:
(a) obtain an input image, and use the detected gaze direction to determine a region of visual accuracy of the input image;
(b) process the input image to generate the context image and the focus image, the context image having a first resolution and the focus image having a second resolution, wherein:
(i) the region of the context image that substantially corresponds to the region of visual accuracy of the input image is masked,
(ii) the focus image substantially corresponds to the region of visual accuracy of the input image, and
(iii) the second resolution is higher than the first resolution; and
(c) communicate the focus image to the processor of the display apparatus.

In yet another embodiment, the processor of the display apparatus is configured to communicate the detected gaze direction to an external image processing device, wherein the external image processing device is configured to:
(a) obtain an input image, and use the detected gaze direction to determine a region of visual accuracy of the input image;
(b) process the input image to generate the context image and the focus image, the context image having a first resolution and the focus image having a second resolution, wherein:
(i) the region of the context image that substantially corresponds to the region of visual accuracy of the input image is masked,
(ii) the focus image substantially corresponds to the region of visual accuracy of the input image, and
(iii) the second resolution is higher than the first resolution;
(c) communicate the focus image to the processor of the display apparatus; and
(d) communicate the context image to the processor of the portable electronic device.

It will be appreciated that the external image processing device could be implemented by way of any suitable equipment having substantial graphics processing capabilities. Examples of such an external image processing device include, but are not limited to, an electronic console (for example, such as a video game console), a desktop computer, and a server. It will be appreciated that the external image processing device could be communicably coupled to the display apparatus wirelessly (for example, via the wireless communication interface of the at least one electromechanical faceplate) or in a wired manner.

Throughout the present disclosure, the term "means for detecting a gaze direction" relates to specialized equipment for detecting a gaze direction of the user's eyes and tracking movement of the user's eyes. It will be appreciated that an accurate detection of the gaze direction enables the display system to closely implement gaze contingency thereon. Therefore, even upon a change in the gaze direction of the user (namely, due to a movement of the user's eyes), the focus image is projected on and around the fovea of the user's eyes and the context image is projected on the retina of the user's eyes, for implementing active foveation in the display system. Furthermore, the means for detecting the gaze direction may or may not be placed in contact with the eyes of the user, when the display apparatus is in use. The means for detecting the gaze direction may also be referred to as an "eye tracker", a "means for tracking a gaze direction", a "gaze-tracking system", or a "gaze-tracking unit". Examples of the means for detecting the gaze direction include, but are not limited to, contact lenses with sensors, and cameras monitoring the position of pupil of the user's eye. Such means for detecting the gaze direction are well known in the art.

Throughout the present disclosure, the term "input image" relates to an image depicting the visual scene that is to be presented to the user of the display system.

In an embodiment, the input image is obtained from an image sensor (for example, such as an image sensor of a digital camera module) coupled to the portable electronic device. In such a case, the processor of the portable electronic device optionally performs image processing functions (for example, such as colour processing, low pass filtering, and the like) on the input image.

In another embodiment, the input image is obtained from a memory unit. The memory unit is implemented by way of hardware, software, firmware, or a combination of these, suitable for storing the input image. Optionally, the memory unit is implemented within the display apparatus. Alternatively, optionally, the memory unit is implemented within the portable electronic device. Yet alternatively, optionally, the memory unit is implemented within the external image processing device.

In yet another embodiment, the input image is a computer-generated image. Optionally, the processor of the display apparatus is configured to generate the input image. Alternatively, optionally, the processor of the portable electronic device is configured to generate the input image. Yet alternatively, optionally, the external image processing device is configured to generate the input image.

Throughout the present disclosure, the term "region of visual accuracy" relates to a region of the input image whereat the detected gaze direction of the eyes of the user is focused. The region of visual accuracy is determined using the detected gaze direction. Notably, the region of visual accuracy is a region of interest (namely, a fixation point) within the input image, and is to be projected onto the fovea of the user's eyes. Furthermore, the region of visual accuracy is a region of focus of the user's gaze within the input image. Therefore, it will be appreciated that the region of visual accuracy relates to a region resolved to a much greater detail as compared to other regions of the input image, when the input image is viewed by a human visual system.

Optionally, the input image is processed to generate the context image and the focus image, based upon the region of the visual accuracy of the input image. The focus image substantially corresponds to the region of visual accuracy of the input image, whereas the context image corresponds to a low-resolution representation of the entire input image. Therefore, the context image includes the region of visual accuracy of the input image along with remaining region of the input image. Furthermore, a size of the context image is larger than a size of the focus image, since the focus image corresponds to only a portion of the input image whereat the detected gaze direction of the eyes is focused (namely, at the region of visual accuracy of the input image) whereas the context image corresponds to the entire input image.

Optionally, the second resolution (of the focus image) is higher than the first resolution (of the context image). It will be appreciated that the first and second resolutions are to be understood in terms of angular resolution. In other words, pixels per degree indicative of the second resolution are higher than pixels per degree indicative of the first resolution. As an example, the fovea of the eye of the user may correspond to 2 degrees of visual field and receive the projection of the focus image of angular cross section width equal to 114 pixels indicative of 57 pixels per degree. Therefore, an angular pixel size corresponding to the focus image would equal 2/114 or 0.017. Moreover, in such an example, the retina of the eye may correspond to 180 degrees of visual field and receive projection of the context image of angular cross section width equal to 2700 pixels indicative of 15 pixels per degree. Therefore, an angular pixel size corresponding to the context image would equal 180/2700 or 0.067. As calculated, the angular pixel size corresponding to the context image is clearly much larger than the angular pixel size corresponding to the focus image. However, a perceived angular resolution indicated by a total number of pixels is greater for the context image as compared to the focus image since the focus image corresponds to only a part of the context image, wherein the part corresponds to the region of visual accuracy of the input image.

Optionally, the region of the context image that substantially corresponds to the region of visual accuracy of the input image is masked. In such an instance, the masking of the region of the context image is performed to hide (namely, obscure) the region of the context image corresponding to the region of visual accuracy of the input image. It will be appreciated that the region of visual accuracy of the input image is represented within both the rendered context image of low resolution (namely, the first resolution) and the rendered focus image of high resolution (namely, the second resolution). Furthermore, the rendered focus image having the second resolution includes more information pertaining to the region of visual accuracy of the input image, as compared to the rendered context image having the first resolution. Therefore, it will be appreciated that the region of the context image that substantially corresponds to the region of visual accuracy of the input image is masked in order to avoid optical distortion of the region of visual accuracy of the input image, when the projection of the rendered focus image is optically combined with the projection of the rendered context image. As an example, pixels of the context image corresponding to the region of visual accuracy of the input image may be dimmed (namely, darkened or blackened) for masking.

Optionally, the masking is performed such that transitional area seams (or edges) between the region of visual accuracy of the input image and the remaining region of the input image are reduced, for example, minimized. It is to be understood that the region of visual accuracy of the input image substantially corresponds to the projection of the rendered focus image (and the masked region of the context image), whereas the remaining region of the input image corresponds to the projection of the rendered context image. Optionally, the masking is performed as a gradual gradation in order to minimize the transitional area seams upon overlapping (or superimposition) of the projections of context and focus images so that the input image appears continuous to the user. Optionally, in this regard, any of the processor of the display apparatus or the processor of the portable electronic device is configured to significantly dim pixels of the context image corresponding to the region of visual accuracy of the input image, and gradually reduce the amount of dimming of the pixels with an increase in distance thereof from the region of visual accuracy of the input image. If an alignment and appearance of the superimposed (or overlapping) projections of the rendered context and focus images are improper and/or have discontinuities, then the input image would also appear improper (namely, optically distorted).

Optionally, the masking is performed using at least one of: linear transparency mask blend of inverse values between the context image and the focus image at the transition area, stealth (or camouflage) patterns containing shapes naturally difficult for detection by the eyes of the user.

Optionally, the at least one electromechanical faceplate further comprises at least one camera, wherein the processor of the display apparatus is configured to control the at least one camera to capture an image of a given real-world environment, and to process the captured image to generate the focus and context images. Notably, such a captured image acts as the input image that is to be used to generate the focus and context images. Therefore, in such a case, the input image is received from the at least one camera of the at least one electromechanical faceplate. It will be appreciated that the at least one camera could be implemented by way of at least one of: a two-dimensional camera, a three-dimensional camera. Examples of the at least one camera include, but are not limited to, a digital camera, an RGB-D camera, a Light Detection and Ranging (LiDAR) camera, a Time-of-Flight (ToF) camera, a Sound Navigation and Ranging (SONAR) camera, a stereo camera, a plenoptic camera, an infrared camera, and an ultrasound imaging equipment.

Optionally, the processor of the display apparatus is configured to communicate the captured image of the given real-world environment to the external image processing device, the external image processing device being configured to process the captured image to generate the focus and context images; and obtain the generated focus and context images from the external image processing device.

Optionally, the at least one camera comprises a first camera and a second camera arranged in a manner that a distance therebetween is equal to or greater than a predefined distance, the first camera being configured to capture a first image and the second camera being configured to capture a second image, wherein the processor of the display apparatus is configured to process the first and second images to generate the image of the given real-world environment (namely, the input image). In such a case, the processor of the display apparatus is configured to employ at least one view interpolation algorithm to generate the image of the given real-world environment. According to an embodiment, the predefined distance is substantially equal to or greater than a maximum known inter-pupillary distance of human beings. As an example, the predefined distance could be equal to 80 millimeters, 82 millimeters, 84 millimeters, 86 millimeters, 88 millimeters or 90 millimeters. According to another embodiment, the predefined distance is equal to an average inter-pupillary distance of human beings. As an example, the predefined distance could be equal to 64 millimeters.

It will be appreciated that the at least one electromechanical faceplate could comprise multiple cameras to capture multiple images of the given real-world environment, wherein such multiple images are to be processed to generate the input image. In an example, the multiple cameras could be arranged at different positions on an outer surface of the at least one electromechanical faceplate. One such exemplary electromechanical faceplate comprising three cameras has been elucidated in conjunction with FIG. 2. In another example, the multiple cameras could be arranged on a spherical element extending from the at least one electromechanical faceplate. In such a case, the multiple cameras may be arranged upon the spherical element in a manner that allows for capturing a 360 degree view of the given real-world environment. Therefore, the input image depicting a desired view of the given real-world environment can be extracted from the captured 360 degree view.

Optionally, the at least one electromechanical faceplate further comprises at least one depth sensor, wherein the processor of the display apparatus is configured to employ the at least one depth sensor for determining a distance between the display apparatus and a region of interest in the given real-world environment, and to focus the at least one camera based upon the determined distance. In operation, the processor of the display apparatus obtains the gaze direction of the user via the means for detecting the gaze direction, and determines the region of interest in the given real-world environment, based upon such detected gaze direction. Thereafter, the processor of the display apparatus obtains the determined distance between the display apparatus and the region of interest in the given real-world environment, via the at least one depth sensor. Consequently, the processor of the display apparatus controls the at least one camera to focus at the determined distance (namely, the determined optical depth) whilst capturing the image of the given real-world environment. It will be appreciated that such an implementation allows for capturing real-world objects present in the region of interest with substantially greater sharpness as compared to other real-world objects present in the remaining regions of the given real-world environment.

Optionally, the at least one depth sensor is implemented by way of at least one of: an ultrasonic depth sensor, an infrared depth sensor, a laser rangefinder.

Optionally, the at least one electromechanical faceplate further comprises at least one motion sensor and at least one orientation sensor, wherein the processor of the display apparatus is configured to employ the at least one motion sensor and the at least one orientation sensor for three-dimensional spatial tracking of the display apparatus. In such a case, the at least one motion sensor and the at least one orientation sensor may be employed to track a three-dimensional spatial position of the display apparatus and a three-dimensional spatial orientation of the display apparatus, respectively. Therefore, by utilizing the aforesaid three-dimensional spatial tracking data obtained from the at least one motion sensor and the at least one orientation sensor, the processor of the display apparatus can identify change(s) in head position and head orientation of the user, when he/she wears the display apparatus on his/her head. Furthermore, optionally, the processor of the display apparatus is configured to communicate the three-dimensional spatial tracking data to at least one of: the processor of the portable electronic device, the external image processing device. Therefore, the processor of the portable electronic device and/or the external image processing device can utilize the aforesaid three-dimensional spatial tracking data obtained from the at least one motion sensor and the at least one orientation sensor to identify change(s) in the head position and head orientation of the user, when he/she wears the display apparatus on his/her head. As an example, the at least one motion sensor may be implemented by way of at least one accelerometer whereas the at least one orientation sensor may be implemented by way of at least one gyroscope.

Optionally, any one of the processor of the display apparatus, the processor of the portable electronic device or the external image processing device, is configured to adjust the visual scene that is to be presented to the user, based upon the three-dimensional spatial tracking data, in real time or near-real time. In an embodiment, the focus and context images constituting the visual scene are adjusted, based upon the three-dimensional spatial tracking data. As an example, the user may move his/her head sideways by a small amount, and such change in the three-dimensional spatial position of the display apparatus may be detected by the at least one motion sensor. Consequently, the processor of the display apparatus may obtain a current gaze direction of user, via the means for detecting the gaze direction, and any one of the aforesaid processing equipment may generate the focus and context images based upon the current gaze direction of the user. In another embodiment, a new visual scene is presented to the user, based upon the three-dimensional spatial tracking data. As an example, the user may tilt his/her head upwards, and such change in the three-dimensional spatial orientation of the display apparatus may be detected by the at least one orientation sensor. Consequently, any one of the aforesaid processing equipment may receive a new input image depicting the new visual scene, obtain a current gaze direction of the user within the new input image, and generate new focus and context images associated with the new visual scene, based upon the current gaze direction of the user.

Optionally, the at least one electromechanical faceplate further comprises a cooling unit, wherein the cooling unit is operable to maintain an ambient temperature inside the display apparatus according to a predefined temperature range, when the display apparatus in operation is worn by the user. The ambient temperature inside the display apparatus relates to a temperature of air within the display apparatus. Notably, when the ambient temperature inside the display apparatus is maintained according to the predefined temperature range, the ambient temperature is an optimal ambient temperature. Optionally, the predefined temperature range is 15 degrees Celsius to 25 degrees Celsius. For example, the cooling unit may be operable to maintain the ambient temperature inside the display apparatus at 15, 16, 17, 18, 19, 20, 21, 22, 23, 24 or 25 degrees Celsius. In operation, the cooling unit maintains the ambient temperature according to the predefined temperature range by at least one of: absorbing heat generated from the components of the display apparatus, dissipating the heat into the given real-world environment of the display apparatus, circulating air within the display apparatus. The cooling unit can be implemented by at least one of: a heat sink, a heat spreader, a fan. It will be appreciated that maintaining the optimal ambient temperature inside the display apparatus allows for providing a safe and reliable operational environment for components of the display apparatus. Furthermore, the optimal ambient temperature allows for substantially reducing sweating of the user's eyes and face, thereby, improving his/her experience of using the display system.

In one example, two fans maintain an ambient temperature of 20 degrees Celsius inside the display apparatus by circulating air inside the display apparatus. In another example, two heat sinks absorb the heat generated from the components of the display apparatus and dissipate such heat into the given real-world environment, to maintain an ambient temperature of 18 degrees Celsius inside the display apparatus. Such heat sinks may comprise a plurality of fins for implementing the aforesaid cooling operation.

Optionally, the at least one electromechanical faceplate comprises a plurality of holes, wherein the plurality of holes are configured to allow the heat generated within the display apparatus to escape into the given real-world environment. In such a case, the plurality of holes allow for cooling the display apparatus.

Optionally, the at least one electromechanical faceplate further comprises a wired communication interface, wherein the wired communication interface is to be employed to communicably couple the display apparatus with at least one external device. In such a case, the wired communication interface is implemented by way of an electrical connector (for example, such as a connector receptacle commonly known as a 'jack', a 'socket', and the like). In operation, the wired communication interface of the at least one electromechanical faceplate electrically engages with a first connector plug of a connector cable, and another wired communication interface of the at least one external device electrically engages with a second connector plug of the connector cable, to establish a wired connection between the display apparatus and the at least one external device. Examples of the wired communication interface include, but are not limited to, a Universal Serial Bus (USB) connector receptacle (namely, a USB port), a High-Definition Multimedia Interface (HDMI) connector receptacle, a Lightening connector receptacle and a Video Graphics Array (VGA) connector. Furthermore, examples of the at least one external device include, but are not limited to, a television, a haptic feedback device, a handheld simulated reality controller, a laptop computer, a desktop computer, another display apparatus (for example, such as a mixed reality display apparatus), a gaming console, and a projector. It will be appreciated that the wired communication interface of the at least one electromechanical faceplate allows for using the display apparatus with a plurality of external devices having different compatibility requirements. In such a case, different wired communication interfaces that are compatible with the plurality of external devices can be provided at the at least one electromechanical faceplate. Therefore, by way of such wired communication interfaces, a single display apparatus can be used with the plurality of external devices without the need for additional equipment (such as adapters).

In an example, the at least one electromechanical faceplate may comprise a USB type-C connector receptacle and the wired communication interface of a haptic feedback device (for example, such as a haptic glove, a haptic wristband, and the like) may be a micro-USB female connector receptacle. In such a case, the connector cable may comprise a USB type-C plug that is configured to engage with the USB type-C connector receptacle and a micro-USB male connector port that is configured to engage with the micro-USB female connector receptacle, for communicably coupling the display apparatus and the haptic device in a wired manner. In such a case, the processor of the display apparatus may be configured to generate a haptic signal that is indicative of a haptic behaviour of at least one object depicted in the visual scene, and play the haptic signal at the haptic feedback device substantially simultaneously with the rendering of the focus and context images associated with the visual scene. Such a haptic signal may be employed to enhance realism associated with the visual scene of the simulated environment when the user uses the display system for gaming, educational training, and the like.

In another example, the at least one electromechanical faceplate may comprise the USB type-C connector receptacle and the wired communication interface of a television may be a HDMI type-A connector receptacle. In such a case, the connector cable may comprise a USB type-C plug that is configured to engage with the USB type-C connector receptacle and a HDMI type-A male connector plug that is configured to engage with the HDMI type-A connector receptacle, for communicably coupling the display apparatus and the television in a wired manner. In such a case, the processor of the display apparatus may be configured to communicate the input image to the television, and display the input image at the television. Such a wired connection of the display apparatus with the television may be employed to allow people present in actual surroundings of the user to view the visual scene whilst the user uses the display system.

Optionally, the wired communication interface of the at least one electromechanical faceplate is to be employed to communicably couple the portable electronic device and the display apparatus.

Optionally, the wireless communication interface of the at least one electromechanical faceplate is to be employed to communicably couple the display apparatus with the at least one external device.

Optionally, the wireless communication interface of the at least one electromechanical faceplate is to be employed to communicably couple the display apparatus with the external image processing device.

Optionally, the at least one electromechanical faceplate further comprises a controlling unit, wherein the processor of the display apparatus is configured to control the at least one electromechanical faceplate via the controlling unit. The controlling unit is implemented by way of hardware, software, firmware, or a combination of these, suitable for controlling operation of the at least one electromechanical faceplate. It will be appreciated that in such a case, since operational processing functionality (namely, operational processing burden) is shared between the processor of the display apparatus and controlling unit, a processing latency in providing the visual scene of the simulated environment is reduced significantly.

The present disclosure also relates to the method as described above. Various embodiments and variants disclosed above apply mutatis mutandis to the method.

Optionally, in the method, the at least one electromechanical faceplate further comprises the at least one camera, wherein the method further comprises controlling the at least one camera to capture the image of the given real-world environment; and processing the captured image to generate the focus and context images.

Optionally, in the method, the at least one electromechanical faceplate further comprises the at least one depth sensor, wherein the method further comprises employing the at least one depth sensor for determining the distance between the display apparatus and the region of interest in the given real-world environment; and focusing the at least one camera based upon the determined distance.

Optionally, in the method, the at least one electromechanical faceplate further comprises the at least one motion sensor and the at least one orientation sensor, wherein the method further comprises employing the at least one motion sensor and the at least one orientation sensor for three-dimensional spatial tracking of the display apparatus.

Optionally, in the method, the at least one electromechanical faceplate further comprises the cooling unit, wherein the method further comprises operating the cooling unit to maintain the ambient temperature inside the display apparatus according to the predefined temperature range, when the display apparatus in operation is worn by a user.

Optionally, in the method, the at least one electromechanical faceplate further comprises the wired communication interface, wherein the method further comprises employing the wired communication interface to communicably couple the display apparatus with the at least one external device.

Optionally, in the method, the at least one electromechanical faceplate further comprises the controlling unit, wherein the method further comprises controlling the at least one electromechanical faceplate via the controlling unit.

DETAILED DESCRIPTION OF THE DRAWINGS

Figure 1A:
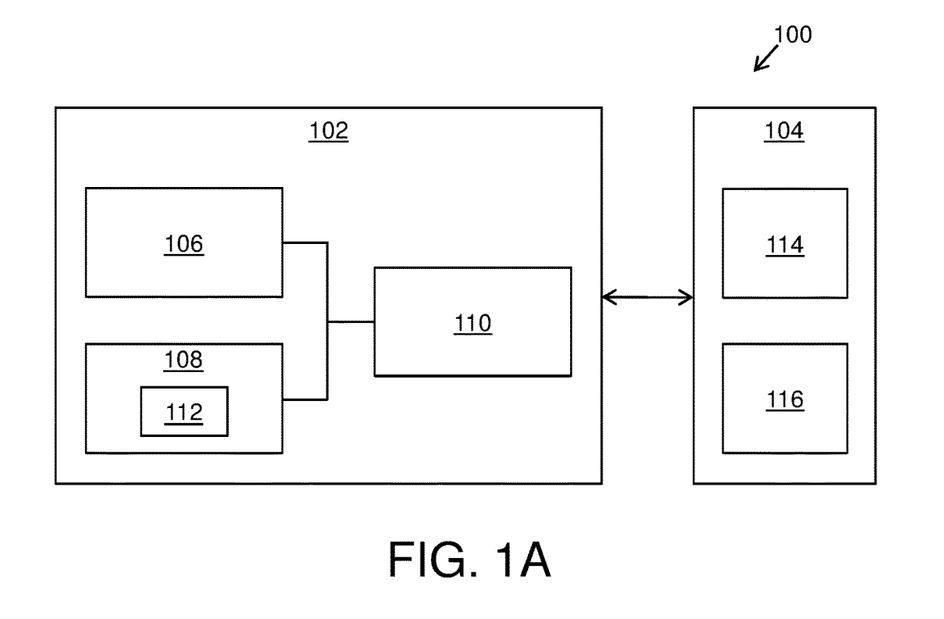
FIGS. 1A and 1B illustrate block diagrams of architectures of a display system comprising a display apparatus and a portable electronic device, in accordance with different embodiments of the present disclosure.
Figure 1B:
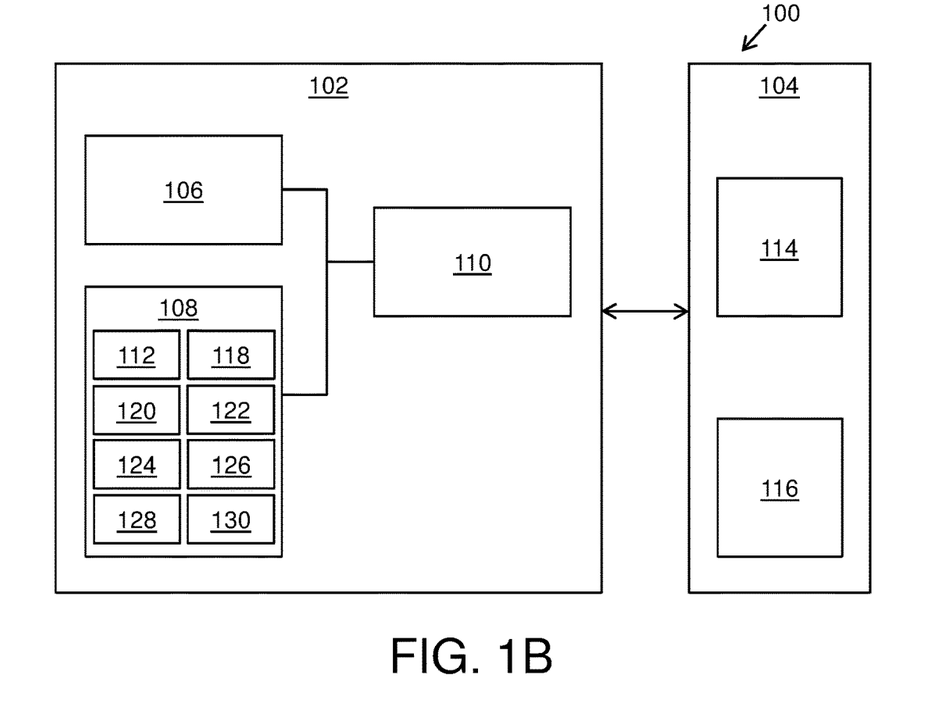

Referring to FIGS. 1A and 1B, illustrated are block diagrams of architectures of a display system 100 comprising a display apparatus 102 and a portable electronic device 104, in accordance with different embodiments of the present disclosure. It may be understood by a person skilled in the art that the FIGS. 1A and 1B include simplified architectures of the display system 100 for sake of clarity only, which should not unduly limit the scope of the claims herein. The person skilled in the art will recognize many variations, alternatives, and modifications of embodiments of the present disclosure.

In FIGS. 1A and 1B, the display apparatus 102 comprises at least one focus display, depicted as a focus display 106; at least one electromechanical faceplate, depicted as an electromechanical faceplate 108; and a processor 110 coupled to the at least one focus display 106 and to the at least one electromechanical faceplate 108. The at least one electromechanical faceplate 108 is detachably attached to an outer surface of the display apparatus 102. Furthermore, the at least one electromechanical faceplate 108 comprises a wireless communication interface 112, wherein the wireless communication interface 112 is to be employed to communicably couple the portable electronic device 104 and the display apparatus 102. The display apparatus 102 is arranged to be detachably attached to the portable electronic device 104. A processor 114 of the portable electronic device 104 is configured to render a context image at a display 116 of the portable electronic device 104, an angular width of a projection of the rendered context image being greater than an angular width of a projection of the rendered focus image. The projection of the rendered context image is optically combined with the projection of the rendered focus image to create a visual scene.

In FIG. 1B, the at least one electromechanical faceplate 108 further comprises at least one camera, depicted as a camera 118; at least one depth sensor, depicted as a depth sensor 120; at least one motion sensor, depicted as a motion sensor 122; at least one orientation sensor, depicted as an orientation sensor 124; a cooling unit 126; a controlling unit 128, and a wired communication interface 130. The processor 110 of the display apparatus 102 is configured to control the at least one camera 118 to capture an image of a given real-world environment, and to process the captured image to generate the focus and context images. Furthermore, the processor 110 of the display apparatus 102 is configured to employ the at least one depth sensor 120 for determining a distance between the display apparatus 102 and a region of interest in the given real-world environment, and to focus the at least one camera 118 based upon the determined distance. Moreover, the processor 110 of the display apparatus 102 is configured to employ the at least one motion sensor 122 and the at least one orientation sensor 124 for three-dimensional spatial tracking of the display apparatus 102. Furthermore, the cooling unit 126 is operable to maintain an ambient temperature inside the display apparatus 102 according to a predefined temperature range, when the display apparatus 102 in operation is worn by a user. Moreover, the processor 110 of the display apparatus 102 is configured to control the at least one electromechanical faceplate 108 via the controlling unit 128. Furthermore, the wired communication interface 130 is to be employed to communicably couple the display apparatus 102 with at least one external device (not shown).

Referring to FIG. 2, illustrated is a schematic illustration of a display system 200 comprising a display apparatus 202 and a portable electronic device 204, in accordance with an embodiment of the present disclosure. The display apparatus 202 is arranged to be detachably attached to a portable electronic device 204 and to be communicably coupled with the portable electronic device 204. As shown, the portable electronic device 204 is arranged in a cavity 206 of the display apparatus 202. Furthermore, the display system 200 is operable to act as a device, for example, such as a virtual reality device, for presenting a simulated environment to a user, when the display apparatus 202 is worn by the user.

The display apparatus 202 comprises at least one focus display (not shown); at least one electromechanical faceplate, depicted as an electromechanical faceplate 208; and a processor (not shown) coupled to the at least one focus display and to the at least one electromechanical faceplate 208. The at least one electromechanical faceplate 208 is detachably attached to an outer surface of the display apparatus 202. The at least one electromechanical faceplate 208 comprises a wireless communication interface (not shown), wherein the wireless communication interface is to be employed to communicably couple the portable electronic device 204 and the display apparatus 202. Furthermore, as shown, the at least one electromechanical faceplate 208 comprises at least one camera, depicted as cameras 210, 212 and 214; at least one motion sensor, depicted as a motion sensor 216; at least one orientation sensor, depicted as an orientation sensor 218; and a wired communication interface 220.

It may be understood by a person skilled in the art that the FIG. 2 includes simplified arrangement for implementation of the display system 200 for sake of clarity, which should not unduly limit the scope of the claims herein. The person skilled in the art will recognize many variations, alternatives, and modifications of embodiments of the present disclosure.

Figure 3:
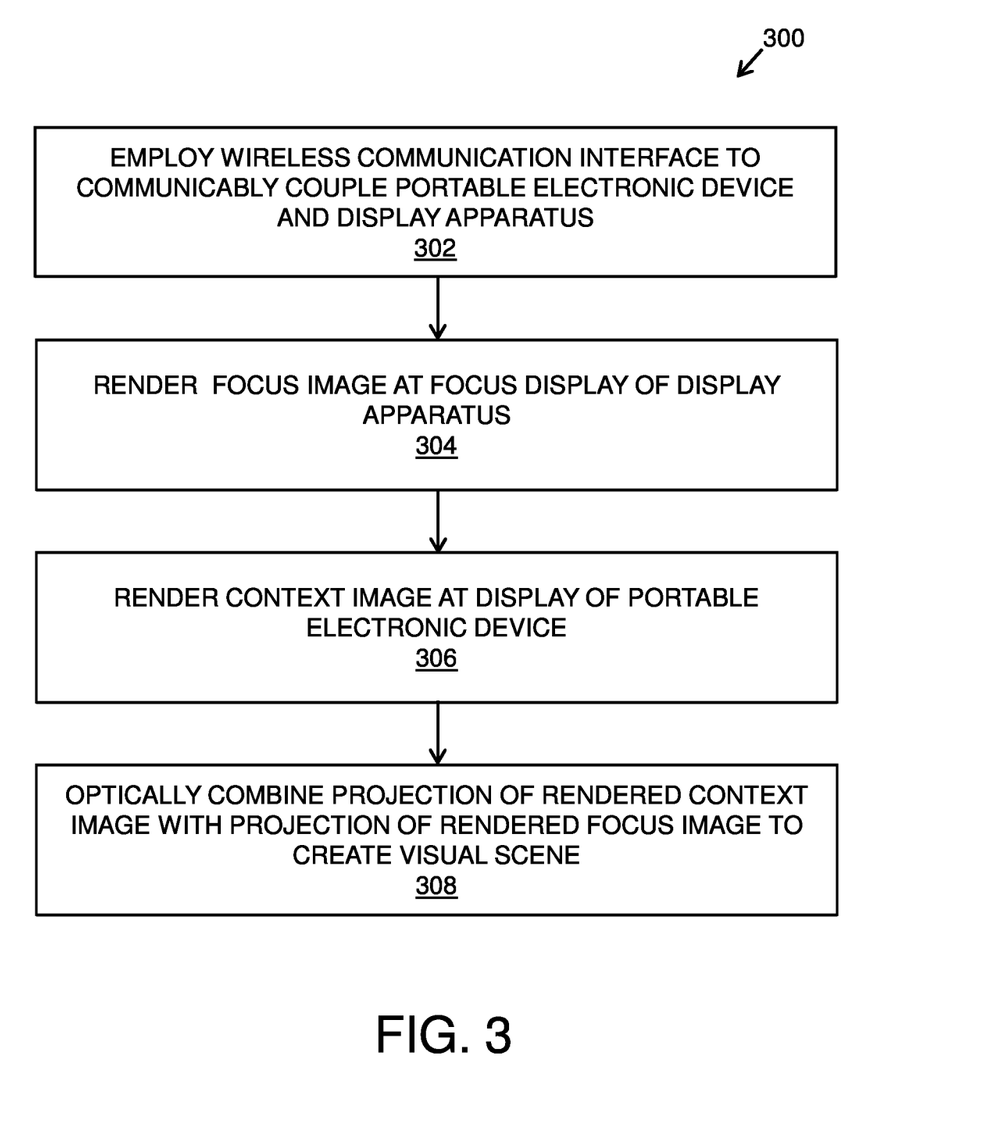
FIG. 3 illustrates steps of a method of displaying via a display apparatus, in accordance with an embodiment of the present disclosure.

Referring to FIG. 3, illustrated are steps of a method 300 of displaying, via a display apparatus, in accordance with an embodiment of the present disclosure. At step 302, a wireless communication interface is employed to communicably couple a portable electronic device and the display apparatus. At step 304, a focus image is rendered at, at least one focus display of the display apparatus. At step 306, a context image is rendered at a display of the portable electronic device, an angular width of a projection of the rendered context image being greater than an angular width of a projection of the rendered focus image. At step 308, the projection of the rendered context image is optically combined with the projection of the rendered focus image to create a visual scene.

The steps 302 to 308 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
at least one focus display;
at least one electromechanical faceplate detachably attached to an outer surface of the display apparatus; and
a processor coupled to the at least one focus display and to the at least one electromechanical faceplate, wherein the processor is configured to render a focus image at the at least one focus display,
wherein the display apparatus is arranged to be detachably attached to a portable electronic device, the at least one electromechanical faceplate comprising a wireless communication interface, wherein the wireless communication interface is to be employed to communicably couple the portable electronic device and the display apparatus, and wherein a processor of the portable electronic device is configured to render a context image at a display of the portable electronic device, an angular width of a projection of the rendered context image being greater than an angular width of a projection of the rendered focus image,
further wherein the projection of the rendered context image is optically combined with the projection of the rendered focus image to create a visual scene.

2. The display apparatus of claim 1, wherein the at least one electromechanical faceplate further comprises at least one camera, wherein the processor of the display apparatus is configured to control the at least one camera to capture an image of a given real-world environment, and to process the captured image to generate the focus and context images.

3. The display apparatus of claim 2, wherein the at least one electromechanical faceplate further comprises at least one depth sensor, wherein the processor of the display apparatus is configured to employ the at least one depth sensor for determining a distance between the display apparatus and a region of interest in the given real-world environment, and to focus the at least one camera based upon the determined distance.

4. The display apparatus of claim 1, wherein the at least one electromechanical faceplate further comprises at least one motion sensor and at least one orientation sensor, wherein the processor of the display apparatus is configured to employ the at least one motion sensor and the at least one orientation sensor for three-dimensional spatial tracking of the display apparatus.

5. The display apparatus of claim 1, wherein the at least one electromechanical faceplate further comprises a cooling unit, wherein the cooling unit is operable to maintain an ambient temperature inside the display apparatus according to a predefined temperature range, when the display apparatus in operation is worn by a user.

6. The display apparatus of claim 1, wherein the at least one electromechanical faceplate further comprises a wired communication interface, wherein the wired communication interface is to be employed to communicably couple the display apparatus with at least one external device.

7. The display apparatus of claim 1, wherein the at least one electromechanical faceplate further comprises a controlling unit, wherein the processor of the display apparatus is configured to control the at least one electromechanical faceplate via the controlling unit.

8. A method of displaying, via a display apparatus comprising at least one focus display, at least one electromechanical faceplate and a processor coupled to the at least one focus display and to the at least one electromechanical faceplate, the at least one electromechanical faceplate comprising a wireless communication interface, the display apparatus being detachably attached to a portable electronic device, the method comprising:
employing the wireless communication interface to communicably couple the portable electronic device and the display apparatus;
rendering a focus image at the at least one focus display of the display apparatus;
rendering a context image at a display of the portable electronic device, an angular width of a projection of the rendered context image being greater than an angular width of a projection of the rendered focus image; and
optically combining the projection of the rendered context image with the projection of the rendered focus image to create a visual scene.

9. The method of claim 8, wherein the at least one electromechanical faceplate further comprises at least one camera, wherein the method further comprises controlling the at least one camera to capture an image of a given real-world environment; and processing the captured image to generate the focus and context images.

10. The method of claim 9, wherein the at least one electromechanical faceplate further comprises at least one depth sensor, wherein the method further comprises employing the at least one depth sensor for determining a distance between the display apparatus and a region of interest in the given real-world environment; and focusing the at least one camera based upon the determined distance.

11. The method of claim 8, wherein the at least one electromechanical faceplate further comprises at least one motion sensor and at least one orientation sensor, wherein the method further comprises employing the at least one motion sensor and the at least one orientation sensor for three-dimensional spatial tracking of the display apparatus.

12. The method of claim 8, wherein the at least one electromechanical faceplate further comprises a cooling unit, wherein the method further comprises operating the cooling unit to maintain an ambient temperature inside the display apparatus according to a predefined temperature range, when the display apparatus in operation is worn by a user.

13. The method of claim 8, wherein the at least one electromechanical faceplate further comprises a wired communication interface, wherein the method further comprises employing the wired communication interface to communicably couple the display apparatus with at least one external device.

14. The method of claim 8, wherein the at least one electromechanical faceplate further comprises a controlling unit, wherein the method further comprises controlling the at least one electromechanical faceplate via the controlling unit.

* * * * *